United States Patent

[11] 3,552,536

[72] Inventor Robert J. Emary
 Oberlin, Ohio
[21] Appl. No. 816,360
[22] Filed Apr. 15, 1969
[45] Patented Jan. 5, 1971
[73] Assignee Gilford Instrument Laboratories Inc.
 Oberlin, Ohio
 a corporation of Ohio

[54] TEST SAMPLE CARRIER TRANSPORT APPARATUS
 14 Claims, 6 Drawing Figs.
[52] U.S. Cl. .................................................. 198/19,
 198/85, 198/173, 211/1.5
[51] Int. Cl. ....................................................... A47f 3/08,
 B23q 5/22, B65g 19/02
[50] Field of Search.......................................... 198/19,
 173, 85; 211/1.5, 71(Inquired)

[56] References Cited
 UNITED STATES PATENTS
3,327,833 6/1967 Jungner...................... 198/19

Primary Examiner—Edward A. Sroka
Attorney—Silverman and Cass

ABSTRACT: A table is arranged for transporting a plurality of test sample carriers in a manner to bring each sample into proper position at a testing station, stop a sufficient time to make the test and then move on to the next sample, repeating this until all samples have been tested. The samples are mounted on carriers which slide on the table. The table is rectangular so that each carrier is required to move in a generally rectangular path. Means are provided for supporting two columns arranged horizontally, each column consisting of a plurality of carriers. There is an endless flexible sprocket chain below the carrier-supporting table which has pins projecting above the table to engage suitable notches formed in the base of each carrier on the opposite long edges thereof. By suitable guide wheels, the flexible sprocket chain follows a path in which there are two inward excursions ending in dwell points, one for each column. The location of the pins and the geometry of the chain path are such that the lateral movement of the columns of carriers is stopped while the endwise movement of the front carrier of each column is effected, and this being done without stopping the continuous movement of the chain. In this way, the front carrier of each column may be translated endwise to leave a space for the next carrier to occupy, but without interference. The lateral movement and endwise movement of the carriers of one column are respectively opposite in direction to those of the other column. Suitable programming means activated by teeth or pins on the carriers stops the entire operation of the drive mechanism each time a sample reaches the testing station and starts the mechanism after the testing has been done.

INVENTOR
Robert J. Emary
BY Silverman & Cass
ATTORNEYS

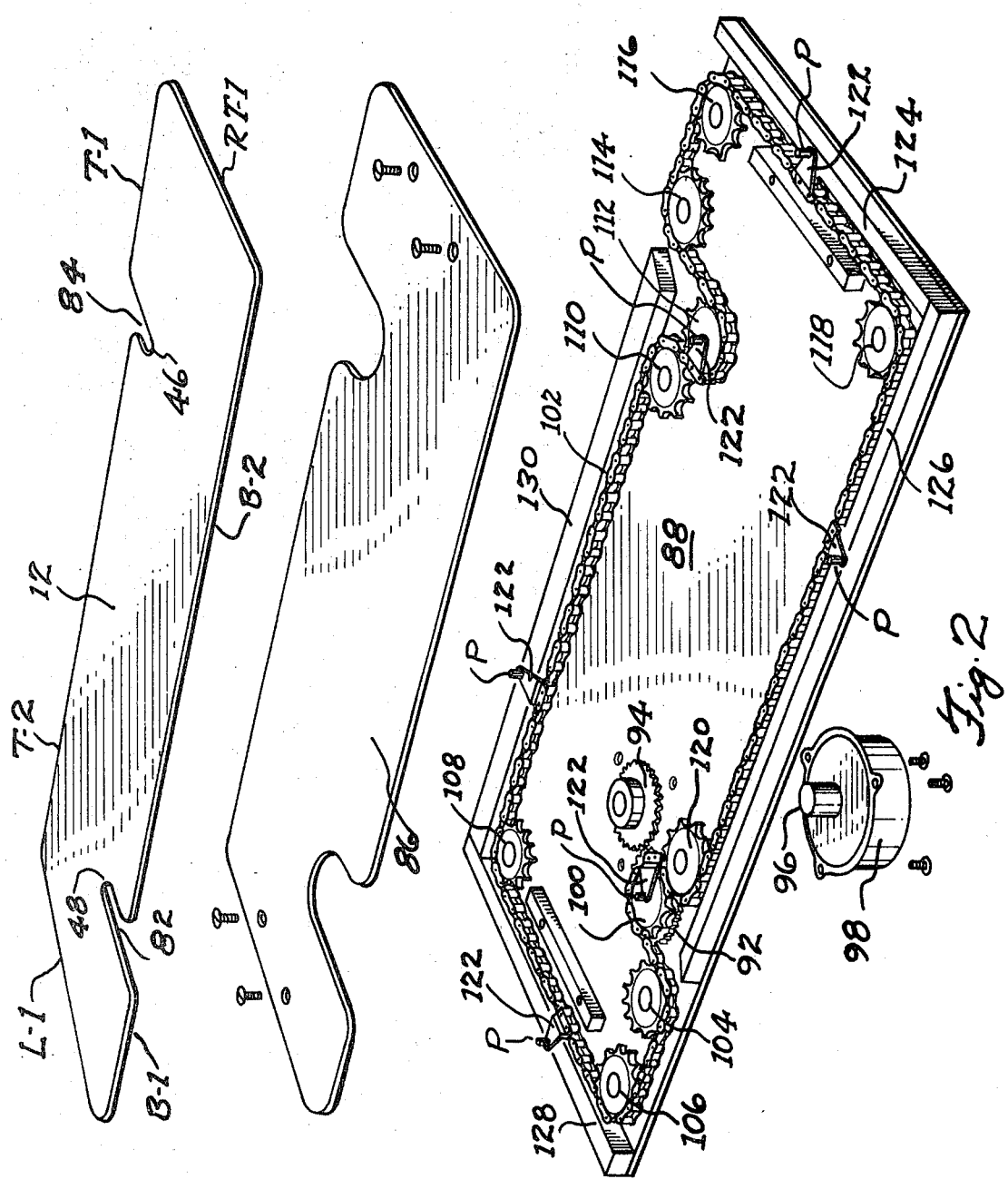

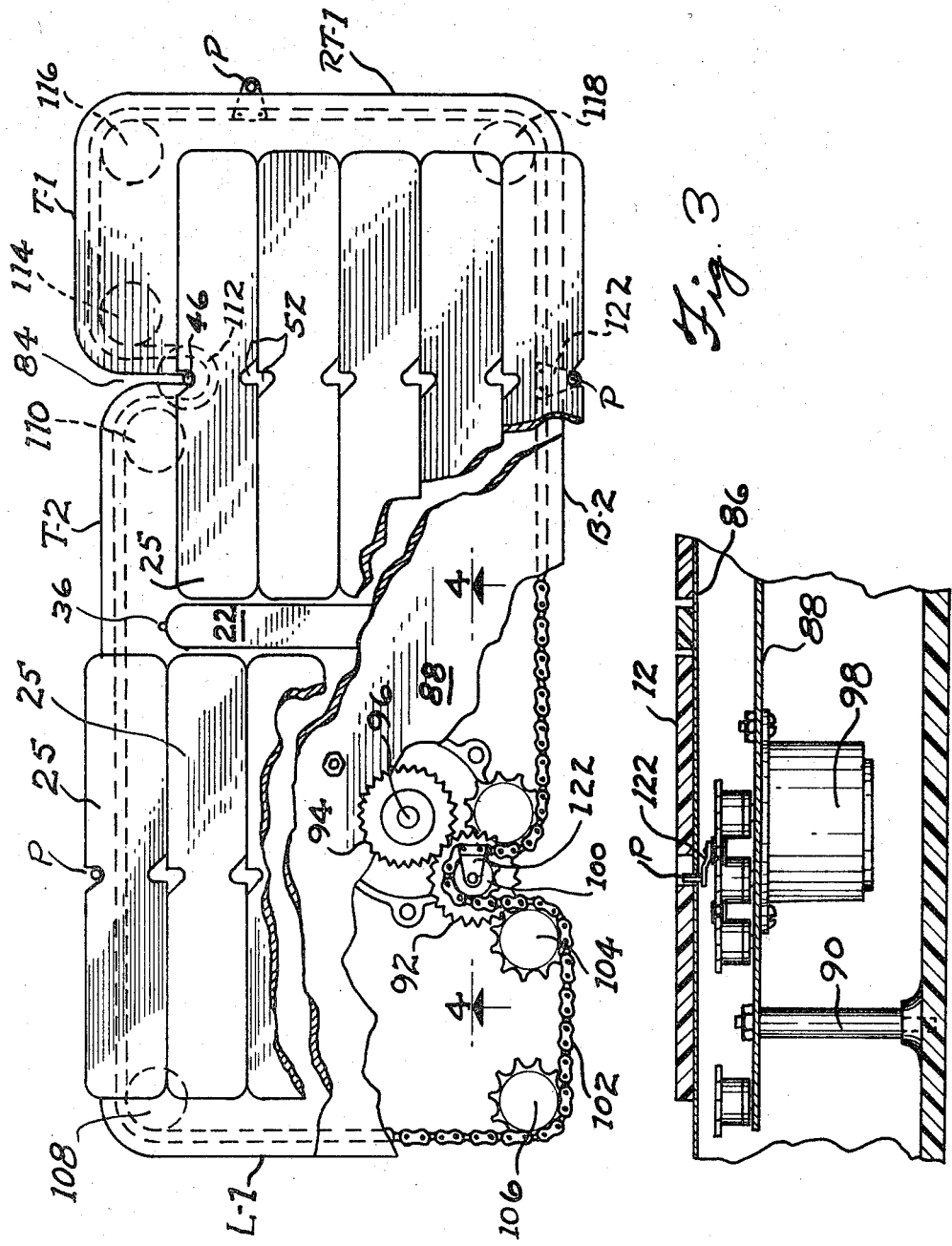

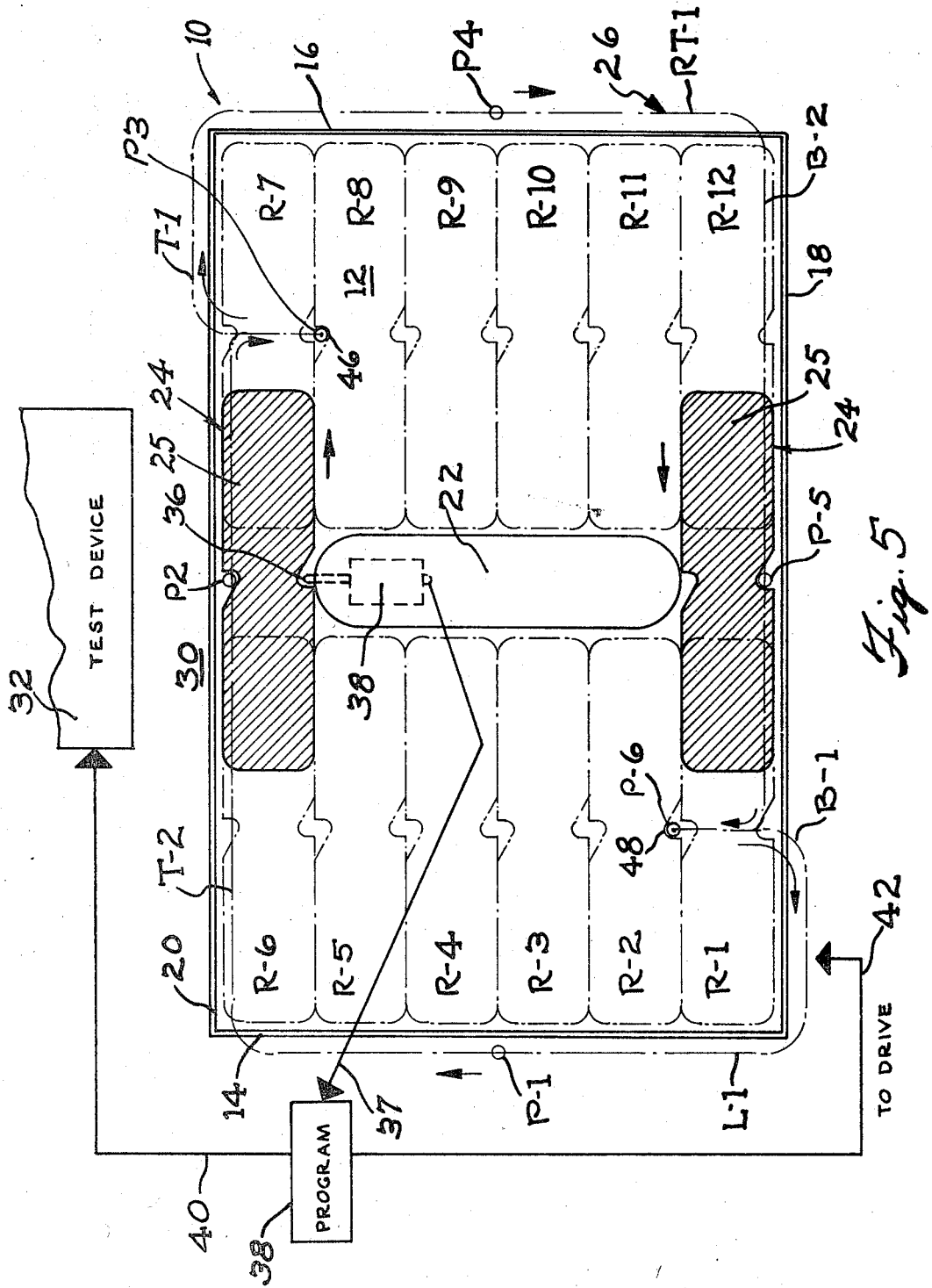

3,552,536

TEST SAMPLE CARRIER TRANSPORT APPARATUS

BACKGROUND OF THE INVENTION

The invention has especially important value in the field of spectrophotometry, but is not limited thereto. Any description of the specific use is only intended by way of example.

In the case of microsample spectrophotometers, a sample of liquid in a suitable container is presented to a dip tube or snorkle by the technician, a small quantity is drawn into a test cuvette by the dip tube, the absorbance of the sample in the cuvette is measured within the apparatus and read on a suitable meter, or other readout device. Other devices operate similarly, but in most cases the sample is presented manually. Some devices of a similar nature have utilized rotating tables, requiring each sample container, usually in the form of a test tube, to be inserted into and eventually removed from a suitable socket on the periphery of the circular table. For any substantial quantity of sample containers the size of the table is wasteful of space, since the central portion is normally useless. It is preferred to use sample containers in racks or carriers, holding, for example, 10 or more containers. These are easily handled and economical of space.

The problem with racks is that it has in the past been difficult to provide a simplified and economical device which is compact and reliable. The shifting of the racks in the paths needed to bring the individual containers into position at the testing station has indicated the need for complex mechanisms. Mechanisms have been devised for programmed rectilinear movement of racks, but such apparatus has limitations. If on an endless belt or chain, obviously the length of the chain in a single rectilinear path must be limited, and the apparatus cannot be left unattended for any substantial length of time, unless provision is made for automatic deactivation. If on short path apparatus, the usefulness is limited.

One example of an attempt to solve this problem is disclosed in an application filed Sept. 20, 1968 and bearing Ser. No. 761,055, owned by the assignee of this application. The structure of the said application requires storage towers, and unless the sample carriers continuously are removed from the storage tower which receives them after the testing procedure, the apparatus stops operating. This limits the number of racks or carriers that can be handled, unless the towers are inordinately large.

Sample containers have been rectilinearly transported in known apparatus, such as for example, cuvette positioners used with spectrophotometers in which the movement is relatively short, and is repeated. Reference may be had to U.S. Pat. No. 3,344,702 for a disclosure of this type of device.

The problems stated above are solved by the invention by the use of a table having the carriers or racks arranged horizontally in two columns and moving the containers of a carrier into the testing station seriatim while translating the carrier from the front of one column endwise to the back of the other column, the remaining carriers of each column being stationary. In this manner, a large number of racks may be supported on a small rectangular table; the mechanism is simple and foolproof; the apparatus is fully automatic; and it is easily integrated into almost any type of testing system.

SUMMARY OF THE INVENTION

A rectangular table supports a plurality of racks carrying sample containers arranged in two columns. The columns move laterally, being pushed from their rear ends by the addition of a rack to each column, followed by a lateral translation of that rack but otherwise not being driven. An endless flexible member is suitably driven and guided below the table and provided with spaced pins extending above the surface of the table, the carriers having notches to engage with the pins and be moved thereby along selective paths. The columns move laterally in opposite directions, and when the front carrier of each column is translated endwise, these movements are also in opposite directions. The pins are arranged to engage in the carriers at only a portion of their complete traverse or loop of the circuit, these portions being chosen to coincide with the desired movement, and the linear movement of each pin during the circuit including two excursion laterally, at the interior limits of which there is no movement of the pin while the flexible member nevertheless continues to move. These limits are in the center of each column at the rear thereof, the path of the pin having changed 90° to make these excursions. Prior to reaching a limit point, the pin is moving parallel to the length of the carriers, has turned 90° and moved laterally in an excursion to the said limit point, stays at said point for a short period of time, reverses its movement to move laterally away from the limit point, turns 90° and then continues once more in the circuit parallel to its original path.

The above-described action is achieved by mounting the pins spaced along the flexible member but on pin-supporting plates which are offset from the flexible member outwardly thereof. At the two limit points mentioned above, the flexible member is led around a guide wheel whose diameter is chosen to be twice the offset distance so that when the portion of the flexible member carrying a particular pin-supporting plate engages the guide wheel, for that portion of the movement of the flexible member that it hugs the guide wheel, the pin will be located at the axis of the guide wheel. he pin rotates, but does not move linearly, although the flexible member is following around the back half of the guide wheel, assuming a full 180° loop around said wheel. Thus to reach the guide wheel, the pin moves in a lateral excursion for a short distance, stops, and reverses its direction, without any stopping of the movement of the flexible member.

SHORT DESCRIPTION OF THE DRAWINGS

FIG. 2 is an exploded perspective view showing the drive mechanism of FIG. 1.

FIG. 3 is a top plan view of the apparatus with portions broken away to show details of the driving mechanism.

FIG. 4 is a fragmentary sectional view through the drive mechanism of FIG. 3 along the line 4—4 and in the direction indicated.

FIG. 5 is a diagrammatic top plan view of the apparatus.

DESCRIPTION OF THE PREFERRED EMBODIMENT

Figure 6:
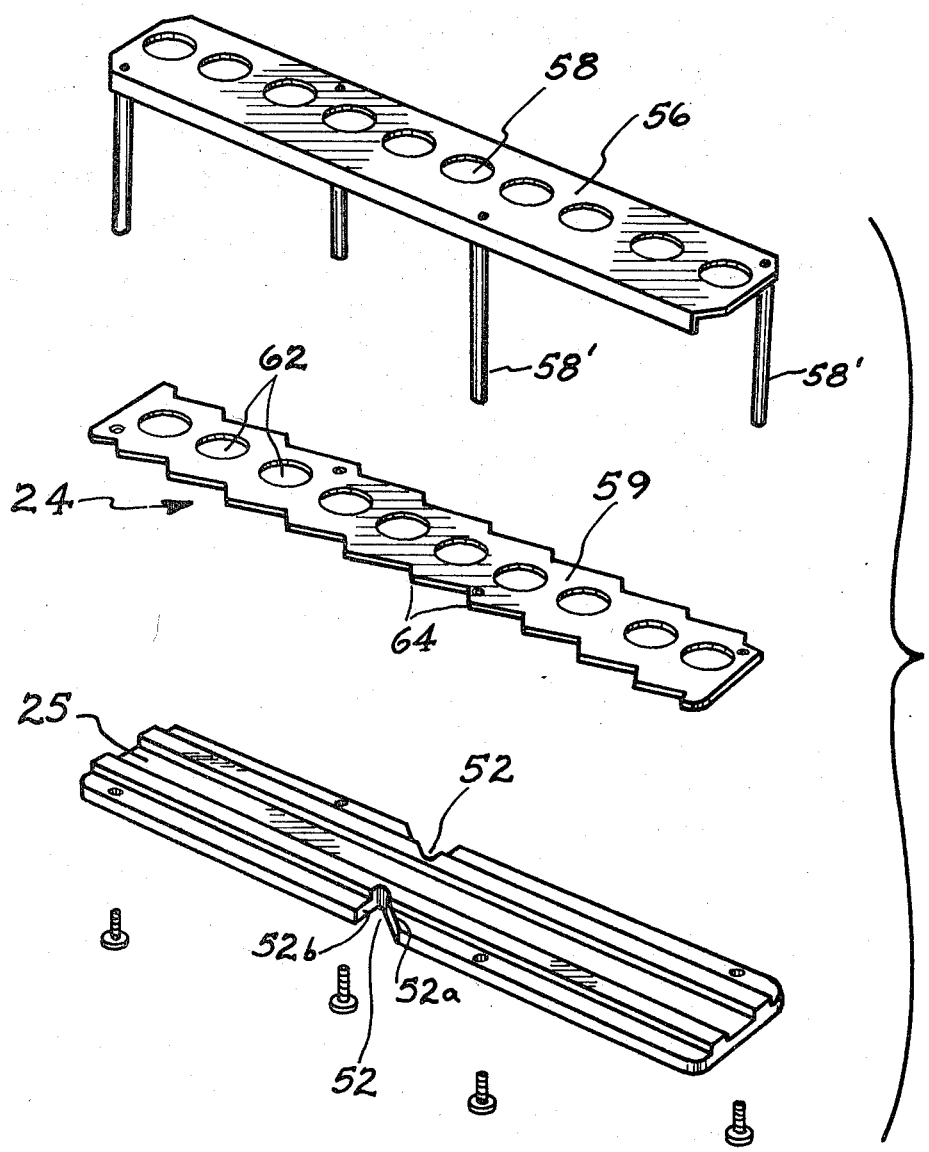
FIG. 6 is a perspective exploded view of the test sample carrier or rack of the apparatus.

Referring first to the diagram of FIG. 5, the apparatus of the invention is designated generally by the reference character 10. It comprises, basically, a table 12 whose surface is divided into two fields, right and left, bordered by framing members 14, 16, 18 and 20, and separated by the spacer 22. There is a plurality of racks or carriers such as designated generally 24 an example of which is shown in FIG. 6, which are slidably mounted on the table 12, and the racks are disposed, each column in one field. In the particular device 10 which is illustrated, it is intended that there will be a total of 10 such carriers, although the device may be constructed so that there may be more. The area of the surface of the table 12, within the framing members is such that there is defined a number of spaces which is equal to two more than the total number of carriers. If desired, less than the total number of carriers may be used, if dummy bases are substituted for the amount less than the total number of complete carriers. Thus, the height of each field is one carrier width more than half the total number of carriers. In the illustrated form, the height or vertical dimension of each field is six times the width of each rack.

For the purpose of explanation, the area in FIG. 5 is divided into rectangles and these are identified to aid in an understanding of the operation of the device. These rectangles are designated R-1 through R-12. The mechanism for moving the carriers is only shown to the extent that the circuitous path taken a by all of the pins is represented by the broken line 26.

The pins are designated P-1 through P-6. In FIG. 5 two base members 25 are shown in the condition of being translated endwise.

The testing station is generally at the point 30, and the test device 32 will have a dip tube 34 (FIG. 1) which is adapted to be moved downward into the sample containers carried by the carriers. The carriers each will have an indexing member which cooperates with activating means, such as for example the pusher 36 of the microswitch 38 located in the spacer 22. The control channel 37 operates the programmer 38 which in turn operates the test device 32 through the channel 40 and the drive mechanism for the transport apparatus through the channel 42. This aspect of the apparatus is capable of wide variation.

In a simple system, each time that the indexing member 59 engages the pusher 36, the flexible drive member stops, the dip tube 34 dips down into the container that is located at the station 30, sucks up a sample, tests it, and then starts up the drive mechanism for the transport apparatus. Since the carriers are required to pass the spacer 22 top and bottom, during endwise movement, the maximum length of the spacer is two carrier widths less than the height of a field, that is, it is shorter than the length of each field by twice the smaller base dimension of the carriers.

There are parts of the path or circuit 26 which lie inside of the framing members and outside of the framing members, and in addition, there are two parts which are normal to the bottom and top parts of the generally rectilinear path. These parts will be called reaches, since they represent for the most part lengths of the flexible member which carries the pins and drives the carriers. The scheme of movement is generally clockwise in FIG. 5. Starting first on the bottom, the horizontal reach B-1 is outside of the framing member 18, and the continuation L-1 is likewise outside of the framing member 14, and parallel therewith. At the top (it being remembered that this is a top plan view and the words "top" and "bottom," etc., in this discussion relate only to relative disposition in the illustration) the path 26 follows into the reach T-2 which is inside of the framing member 20 and parallel therewith. The path 26 at the right hand end of the reach T-2 moves downwardly at right angle thereto to the point 46 and then moves back upon itself to the reach T-1 which is identical and diagonally opposite to the reach B-1, being outside of the framing member 20, and parallel therewith. The reach RT-1 is identical and opposite to the reach L-1 being outside of the framing member 16 and parallel therewith. The lower right hand reach B-2 is identical and opposite to the reach T-2 being inside of the framing member 18 and parallel therewith. The point 48 is identical and diagonally opposite to the point 46.

Considering the movement caused by the pins and the flexible drive member we may first consider the movement of the pin P-5 which is here shown moving to the left along the reach B-2 and transporting the bottom carrier 24 endwise to the left. Obviously the space R-1 must previously have been cleared for this by the pin P-6 having moved laterally to the point 48. This movement has carried a carrier formerly located in the space R-1 into the space R-2 at the same time that all of the carriers formerly in the spaces R-2, R-3, R-4 and R-5 were advanced laterally. Note that this has occurred prior to the commencement of the movement of the bottom carrier 24 from the space R-12 endwise. Thus, when the space R-1 was cleared, so was the space R-7. Also when the pin P-5 picked up the carrier 24 on the bottom to translate it endwise to the left, the pin P-2 picked up the upper carrier 24 to translate it to the right.

It follows from the mirror operation of the apparatus, that when the space R-1 was cleared by movement of the pin P-6 inwardly of the framing member 18 to the point 48, the space R-7 was also cleared by movement of the pin member P-3 inwardly of the framing member 20 to the point 46.

From the condition shown in FIG. 5, the bottom carrier 24 continues to move to the left, but the pin P-6 must be out of the way before any interference occurs. Accordingly, the geometry is readily chosen such that the pin P-6 leaves the point 48 and moves downward to the reach B-1, out of the path of endwise movement of the lower carrier 24 by the time the leading end of the carrier arrives alongside of the point 48. The lower carrier enters and fills the space R-1 at the time that the pin P-5 is ready to move upwardly. Now the space R-6 has been fully cleared because the upper carrier 24 is in the space R-7. Pin P-5 now moves laterally upward, as viewed in FIG. 5, and carries the carrier 24 from the space R-1 into the space R-2, while at the same time pushing all of the carriers in the spaces R-2 through R-5 forward, these carriers readily sliding on the smooth surface of the table 12.

As the front carrier of each column enters its frontmost space, that is, the spaces R-6 and R-12, respectively, the side notches (to be described in detail) will meet the respective pins coming around from the reaches which are outside of the framing members. Thus, the pin P-1 will meet the notch of the carrier at the front of the left column when the pin P-5 reaches the point 48.

Figure 1:
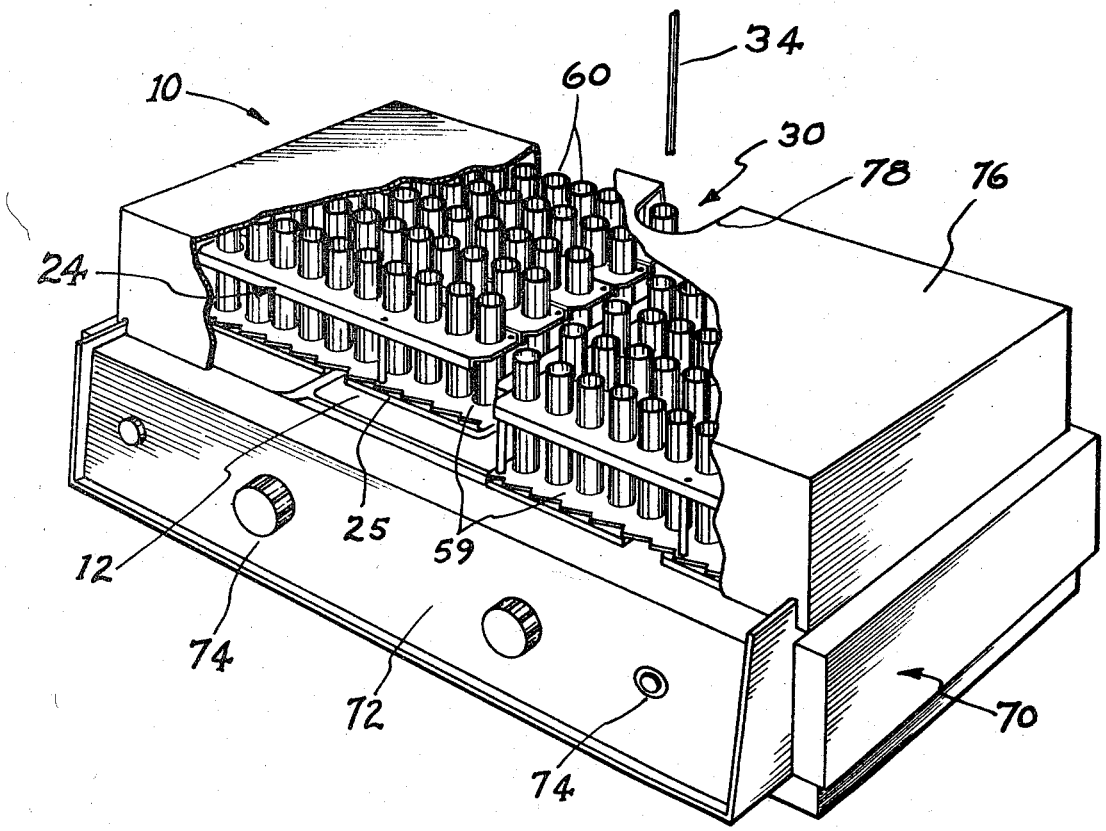
FIG. 1 is a perspective view, partially broken away, showing a test sample carrier transport apparatus constructed in accordance with the invention.

Referring now to the remaining FIGS. attention is invited first to FIG. 6 which illustrates a simplified form of carrier 24. This structure is capable of considerable variation, but the principles used will be the same. The base 25 in this case is a hard plastic member of phenolic resin to enable easy sliding on the table 12. There are notches 52 in the centers of the opposite longer edges, these notches each having an elongate tapered entrance 52a and a normal pushing surface 52b. The pins P are adapted to meet the moving carriers as previously described, entering the notches 52 along the entrance edges 52a and coming into engagement with the normal pushing surfaces 52b. Thereafter the pins move the carriers. Each carrier has a support plate 56 provided with sockets 58 which hold the containers 60 (FIG. 1). The plate 56 is mounted on support standards 58' suitably secured to the base 25 by fasteners as shown. The indexing member 59 is also secured by the same fasteners above the base and held in place by the standards. It serves two functions, that of supporting the bottom ends of the containers by means of the openings 62, and that of providing the teeth 64 to activate the testing. Each socket 58 corresponds to a tooth, and when the tooth corresponding to a sample container engages the pusher 36, the testing cycle is activated.

Reference may now be had to the other FIGS. for the details of the structure 10.

The device 10 may include any suitable housing 70 which may have the programming means 38 or other related apparatus contained therein and controlled from a front panel 72 by suitable controls 74. Preferably, the entire apparatus has a removable cover member 76 for prevention of contamination and the like, there being a notch in the cover member at 78 to define the testing station 30. The racks 24 and containers 60 are readily seen in FIG. 1. Likewise the indexing members 59 can be seen. From the description of the carriers 24 it will be obvious that the same are identical front and back, assuming a direction of movement perpendicular to the longer dimension, and hence it is immaterial how they are disposed to form the columns on the table 12.

Preferably the table 12 is a smooth thin plate provided with edges defining the reaches and dwell points. These carry the same designations in FIGS. 2 and 3 as in FIG. 5. The pin paths which are followed when the pins move inwardly are designated 82 and 84 these being in the form of slots. A second plate 86 provides a part of the support for the mechanism, but the exact arrangement is not important. The chassis plate 88 carries most of the mechanism and is supported within the housing 70 on suitable mounting spacers 90. The principal drive gear 92 is coaxial with the point 48 and it in turn is driven by a reduction gear 94 fixed to the shaft 96 of the electric motor 98. The latter is mounted below the chassis plate 88.

The sprocket wheel 100 is the drive for the sprocket chain 102 which follows the path parallel with the path 26 dictated by the sprocket idlers 104, 106, 108, 110, 112, 114, 116, 118 and 120. The pins P which were previously mentioned are mounted to the chain 102, and it will be noted that the mounting is affected by pin-supporting plates 122 which are riveted to spaced links of the chain 102. The chassis plate 88 may have support slides 124, 126, 128 and 130 for supporting the pins in their movement. The framing members 14, 16, 18 and 20 may be formed by any suitable structure which is mounted in association with the table 12. The movement of the pins P will in certain locations carry them through the framing members, and hence in construction, this must be taken into account. It will be also noted that the pins are spaced outwardly from the sprocket chain 102, and that when they pass inwardly along the slots 82 and 84, they describe a node extending inwardly of the loop otherwise described by the path 26.

Other constructional details should be obvious from the drawings, and likewise, it is obvious that variations of a wide range may be made without departing from the spirit or scope of the invention as defined by the appended claims.

I claim:

1. A test sample carrier transport apparatus for moving a plurality of test sample containers seriatim into testing position relative to a testing station, each carrier having an elongate generally rectangular base and means for carrying a plurality of containers therein and indexing means adapted for cooperation with structure for stopping the movement at said testing station long enough for a test to be performed, and comprising:
  A. a rectangular table having means defining a pair of fields spaced from one another, and each field adapted to support a column of carriers side by side;
  B. the width of each field being substantially the same as the greater dimension of a carrier base, the length of each field being substantially equal to half the number of bases plus one multiplied by the smaller dimension of a carrier base;
  C. a spacer between fields and the spacer being arranged perpendicular to the greater dimension of the carrier bases during normal disposition of the carrier bases when arranged in columns;
  D. the spacer being shorter than the length of each field by twice the smaller base dimension to permit simultaneous endwise movement of a carrier from one field to the other at opposite ends of the columns;
  E. a flexible endless member and drive means therefor, the member being arranged to move in a guided loop generally following the periphery of the table and having a plurality of carrier engaging pins spaced along the length of the member and protruding above the table; and
  F. means defining the path taken by the pins in a continuous cycle which is adapted to
    i. push each column laterally along the length of its field from the rear of the column to the front by one small base dimension; and
    ii. translate the frontmost carrier of each column endwise to a position at the rear of the other column at mutually exclusive periods.

2. The apparatus as claimed in claim 1 in which said last means include structure for leading the pins to make a limited inwardly-directed excursion relative to said general loop in the center of each column at the rear thereof and thereafter to withdraw from said excursion.

3. The apparatus as claimed in claim 2 including structure for directing the pins to move along opposite edges of the table from one field to the other to capture a base from the front of one column and translate it endwise to the rear of the other column.

4. The apparatus as claimed in claim 3 and including structure for directing the pins to move outside of the field at all other times so as not to interfere with the movement of carriers.

5. The apparatus as claimed in claim 2 in which said carrier-engaging pins include carrier pin mounting means secured to said flexible member to space the pins outside of the said loop generally followed and defined by the endless member.

6. The apparatus as claimed in claim 5 in which there is a rotary guide wheel for said flexible endless member having an axis spaced inwardly from said loop at the point of each such excursion, and the spacing of the pins from the flexible member being substantially equal to radius of each of such rotary guide wheels so that each pin entering the excursion will move to the axis of a rotary guide wheel and return on straight line.

7. The apparatus as claimed in claim 6 in which the flexible endless member is a sprocket chain and the means defining the path taken by said pins comprise a plurality of sprocket wheels engaging said loop.

8. The apparatus as claimed in claim 7 in which the rotary guide wheels comprise sprocket wheels having the chain wrapped around 180° of each, respectively.

9. The apparatus as claimed in claim 1 in combination with a plurality of test sample carriers, comprising said number and each carrier comprising:
  A. an elongate generally rectangular base having means for carrying a plurality of sample containers therein;
  B. indexing means adapted for cooperation with structure for stopping the movement at a testing station long enough for a test to be performed;
  C. the base having a pin-receiving notch in each of its long edges at the center thereof, and each notch adapted to cooperate with a pin engaged therein to provide the movement as aforesaid; and
  D. the base being of rectangular dimensions such that said field width and length are as defined hereinbefore.

10. The apparatus as claimed in claim 9 in which said notch in each case has a slanted entrance edge and a right angle pusher edge, the apparatus being constructed so that the movement of a pin in translating a carrier endwise will be effected with said pin engaging against said right angle edge.

11. The apparatus as claimed in claim 9 in which said spacer has activating means cooperating with said indexing means when said carrier is being translated endwise from one column to another.

12. The apparatus as claimed in claim 11 in combination with programming means driven by said activating means for controlling the movement of said carriers relative to said testing station.

13. A sample carrier for use with a test sample carrier transport apparatus and comprising an elongate rectangular base, a container supporting structure on top of said base, a central notch in each of the long edges of said base for receiving a pusher pin therein to enable translation of said carrier on a table surface, each notch having a slanted entrance edge and a right angle pusher edge, the slanted edges being directed in opposite directions.

14. The carrier as claimed in claim 13 in which said carrier has indexing means for cooperation with a program activator.